Nov. 3, 1964  G. ZIMMERMAN  3,155,479
CENTRIFUGAL MOLDS AND METHOD OF FORMING HOLLOW ARTICLES
Filed May 25, 1960  2 Sheets-Sheet 1

INVENTORS
GEORGE ZIMMERMAN
BY W. A. Schaich &
E. J. Holler
ATTORNEYS

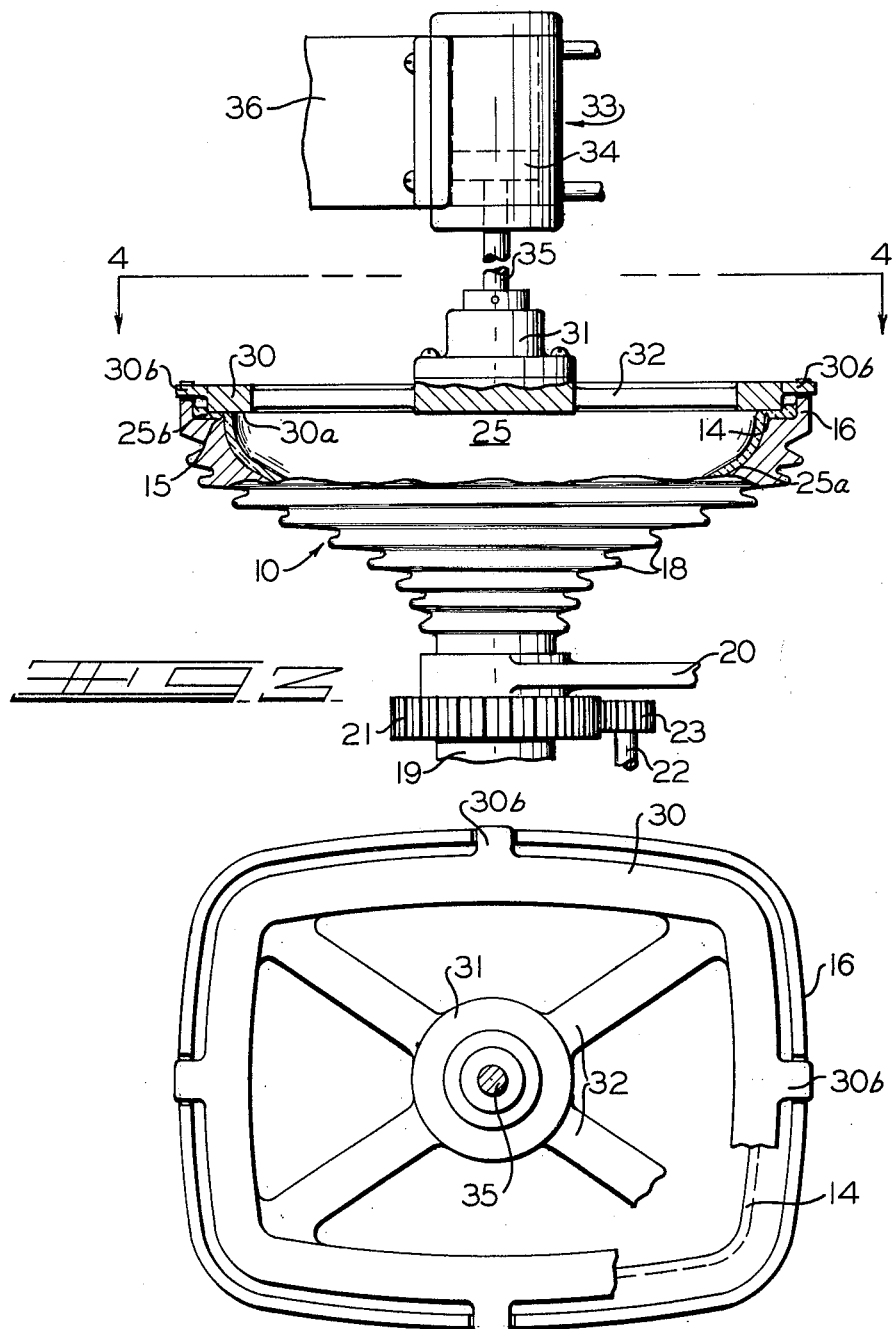

United States Patent Office 3,155,479
Patented Nov. 3, 1964

3,155,479
CENTRIFUGAL MOLDS AND METHOD OF
FORMING HOLLOW ARTICLES
George Zimmerman, Muncie, Ind., assignor, by mesne
assignments, to Owens-Illinois Glass Company, Toledo,
Ohio, a corporation of Ohio
Filed May 25, 1960, Ser. No. 31,718
8 Claims. (Cl. 65—70)

The present invention relates to molds for use in molding hollow bowl-shaped or similar articles from molten glass or other molten or plastic material, the subject molds being rotatable about their vertical axes for shaping or molding the material by centrifugal force.

An object of the present invention is to provide a mold construction and method of molding which will permit an effective control of the distribution and shaping of the glass or material being molded and overcome various difficulties encountered in the use of conventional molds and methods.

The invention as described and illustrated herein is adapted to molding thick-walled bowls or hollow bodies such as funnel members for television picture tube envelopes. In molding such a bowl or funnel, the charge or gob of molten glass is placed in the mold which is then rotated rapidly thereby causing the glass to be spread and moved upwardly along the flaring sides of the mold and over a peripheral ledge near the upper edge of the mold. The glass spreads outwardly over the ledge in a horizontal direction and then upwardly to form the rim of the bowl.

Previously, in conventional processes for fabricating funnel members of cathode-ray tube envelopes by centrifugal casting, the hollow glass article having a frusto-conical or frusto-pyramidal shape has been formed from a charge of molten glass and then the excess or moil portion of the glass normally deposited in the rim portion of the mold has been subsequently severed from the main body portion of the article. Apparatus and method for practicing such independent processes following spinning are shown in Patents Nos. 2,629,206 and 2,662,289 to Giffen, issued February 24, 1953, and December 15, 1953, respectively. These disclosures relate to a process of forming an internal annular groove or score within an upper portion of the hollow article after centrifugal casting while the glass is still slightly soft and workable prior to its solidifying and removal from the forming mold. The initiation of the severance of the excess glass is obtained through introducing a severe thermal gradient between opposite sides of the subsequently formed groove to effect separation of the moil from the article body portion.

The present invention provides a mold and method of forming an integral annular groove or recess in the molded article adjacent the region of the mold ledge which also serves to provide proper flow of the glass up over the top edge of the mold during centrifugal casting. The invention provides several forms of recesses having sharply-defined re-entrant angles designed to permit severance of the moil portion of the article by cooling and solidifying the glass on opposite sides of the recess with differential thermal gradients.

Accordingly, a primary object of this invention is the provision of a glass-forming method for centrifugally casting a hollow funnel-shaped article which takes advantage of the workable character of the glass during formation of its body and moil portions to provide an area of severance therebetween.

Another object of the present invention is to provide a hollow bowl-shaped mold adapted to centrifugal casting of thermoplastic material, the mold having a sharply-defined corner at an upper region thereof designed to provide a thin annular section to effect severance thereat by thermal shear.

Another object of this invention is to provide a hollow non-divided open mold for centrifugal casting of molten glass about a vertical axis, the mold having a horizontally projecting annular ledge surrounding the upper region of its upwardly flaring sidewalls and an upwardly projecting hardened knife edge at a terminating region of its molding surfaces for forming an annular recess during centrifugal casting.

Another object of the present invention is to provide a method of centrifugal casting of thermoplastic material into a hollow bowl-shaped article having an upwardly projecting rim portion joined to the main body portion by a simultaneously-formed thin annular cross-section adapted to effect severance of the article thereat.

A still further object of this invention is to provide a method of effecting initiation of the severance of the excess glass from a hollow funnel-shaped glass article formed concomitantly with its main body portion during formation of the hollow article from a charge of molten glass.

Other objects and advantages of the present invention will appear hereinafter.

Referring to the accompanying drawings:

FIG. 3 is a side elevational view partly in section of a modified form of mold and supplemental forming apparatus in accordance with the invention.

FIG. 4 is a plan view of the modified mold and forming apparatus taken along the line 4—4 of FIG. 3.

Figure 1:
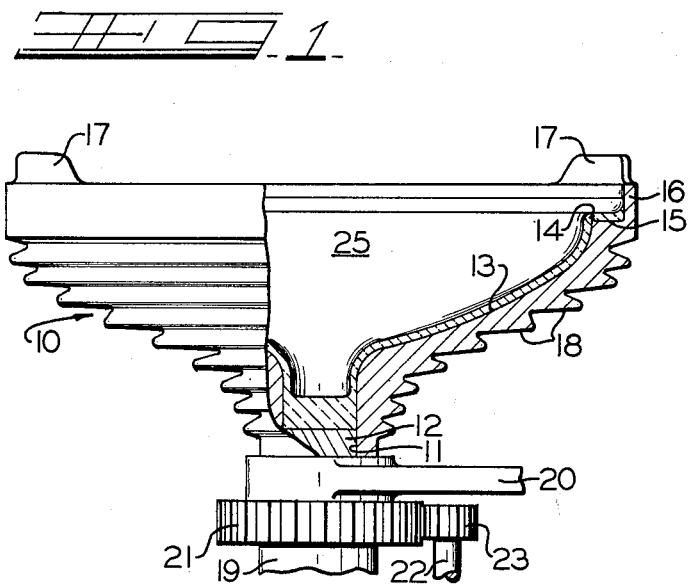
FIG. 1 is a side elevational view partly in vertical section of a mold construction in accordance with the principles of my invention.
Figure 2:
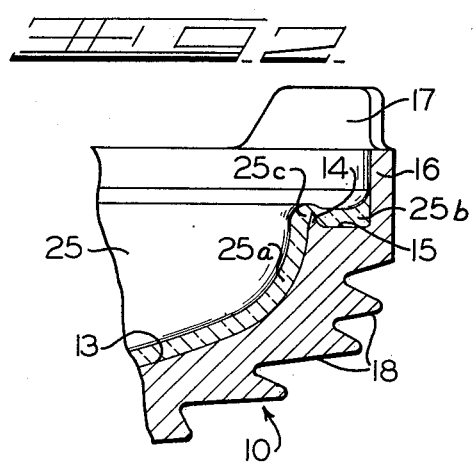
FIG. 2 is an enlarged fragmentary vertical sectional view of one portion of FIG. 1.

Referring to FIGS. 1 and 2 the mold 10 is shaped and adapted to molding the bowls or funnel members of television picture tubes and particularly a funnel having an approximately rectangular contour at its large open end. Mold 10 is formed with a bottom opening 11 within which is mounted a vertically movable knock-out valve 12. The mold sidewalls 13 are curved outwardly and upwardly as shown in FIG. 1, the upper portions being substantially vertical and terminating at a substantially horizontal peripheral ledge or top surface 15. At the outer edge of ledge 15 a vertical flange 16 is formed comprising the perimeter of the mold. Peripheral flange 16 has a plurality of upwardly extending wings or ears 17 disposed at the corners of the mold to intercept any molded material which may escape flange 16. The mold is also provided along its exterior surfaces with a plurality of cooling flange portions 18 extending horizontally outwardly.

The mold has a downwardly projecting spindle portion 19 which constitutes a supporting extension thereof. The mold is rotatably mounted on ball bearings (not shown) on a supporting arm or frame 20. The mold is rotated by a gear 21 keyed to spindle 19 which gear meshes with a driving gear 23 keyed to a drive shaft 22. Shaft 22 is preferably driven by a hydraulic motor (not shown). Other conventional means of rotatably driving the mold are illustrated in Patent No. 2,771,712 to Reynolds, assigned to the same parent assignee as the present application.

The mold spindle 19 is hollow to permit vertical movement of the ejector valve 12 to release the molded article 25 from the mold by its upward movement. The article as molded centrifugally is formed with a short cylindrical tubulation or "nubbin" at its lower end.

The mold is provided with an upwardly extending annular rib or protuberance 14 disposed at a region intermediate of the terminating region of the mold sidewalls 13 and the peripheral ledge 15. As shown in FIG. 2 the protuberance 14 consists of an upwardly projecting sharply-pointed knife-edge comprising a continuation of the mold sidewalls 13 on one side and the inner dimension of ledge 15 on the other side. The sharply-pointed rib or protuberance 14 terminates a horizontal plane and is hardened such as by nitriding or is comprised of wear-resistant alloy such as "Colmonoy" to minimize wearing effects. The hot glass contours over the knife edge 14 during spinning and forms a stress riser condition due to the re-entrant groove which on subsequent cooling of the article causes the excess moil of the spun funnel to ring-off and separate from the body portion. The corner portion of the mold can also be contoured into an essentially right-angled corner to obtain another shape of groove or recess.

In operation of the mold a gob or charge of molten glass is dropped into a central region of the mold and the latter rotated at a high speed so that centrifugal force causes the thermoplastic glass to spread and move upwardly over the sidewalls of the mold until it reaches and overflows the annular rib 14. The sidewalls 25a of the molded article are formed having an exterior surface complemental to the inner configuration of mold sidewalls 13. The rim portion 25b of the molded article is formed by the glass which passes up and over rib 14 and deposits in the upper mold region defined by horizontal ledge 15 and upstanding flange 16. The main body portion of the article 25 and the moil or excess glass portion 25b are joined by a deeply-grooved necked portion 25c having a minimum sidewall thickness as shown in FIG. 2.

The annular groove or recess 25c which is formed in a horizontal plane by sharply pointed rib 14 permits ready separation of the rim or moil portion 25b by thermal shear after the article is removed from the mold and permitted to cool in preferably an inverted position. As the temperature of the rim portion lowers more rapidly than the body portion on cooling, the retardation of heat transmission through the grooved section establishes a severe thermal gradient along the grooved line and the moil portion inherently breaks away from the funnel proper.

When the glass due to its characteristics and the particular mold configuration does not contour into a stress riser having a minimal cross-section, the apparatus shown in FIGS. 3 and 4 is employed to press the soft glass down onto the knife edge 14 to obtain a cross-sectional area of desired thickness. An annular ring 30 having a planar lower surface 30a is mounted over and above the large open end of mold 10. Ring 30 has a plurality of spaced-apart ears 30b which fit into complemental openings in the upwardly extending flange portion 16 to index and align the ring with the mold. Ring 30 is mounted on a freely rotatable central hub 31 by a series of radially projecting spider-like arms 32. The ring 30, freely-rotatable hub 31, and the spider assembly 32 are mounted over the open end of the mold in coaxially aligned relation. The ring mechanism is carried by an air cylinder motor 33 having a piston 34 and a piston rod 35 which connects to the rotatable ring hub 31. The air cylinder motor is mounted on a horizontal arm 36 which is adapted to being swung over the mold. Thus, the mold ring 30 is disposed in alignment with the mold during spinning, its under side being adjacent the upwardly projecting knife-edge or rib 14 after the mold is charged. The flat plate 30 is then employed to press the soft glass down onto the knife edge during latter stages of the spinning cycle. The plate is lowered either to apply a continuous pressure to the glass or to allow the glass to flow up and over the knife edge to form the rim portion, and then the ring is brought down sharply several times to effect a discontinuous line of breakage between the funnel body and rim portion 25a and 25b. Alternately, the ring is positioned to provide a regulated annular spacing between its underside and rib 14 for the excess glass to flow therebetween.

The foregoing procedure provides means for at least initiating the breaking or cutting off of superfluous glass within the mold conjunctively as a part of the spinning cycle and eliminates loss of parts due to severing or scoring defects. The prescribed method of manufacture of thick-walled funnels or bowls is such that the horizontal rim surface formed just interiorly of the knife-edge has a smooth annular surface for subsequent sealing to complemental surfaces of a television picture tube face plate as by glass-to-glass fusion. The glass articles require no additional scoring or severing operations to cut off any undesired portions thereof such as practiced heretofore in known methods. The rim portion remains integrally attached to the article body for concurrent removal of the article from the mold and shortly thereafter separates by thermal shear. Thus, the mold is available for recharging and forming subsequent articles.

Various modifications may be resorted to within the spirit and scope of the appended claims.

I claim:

1. A hollow mold for centrifugal casting of a hollow glass article, said mold being open at its upper end and having upwardly-flared inner wall surfaces providing a hollow generally funnel-shaped mold cavity, a depending circumferential ledge extending horizontally outwardly from the upper edge of said wall surfaces, a convergent exteriorly-projecting continuous annular rib disposed at the intersection of said ledge and the upper edge of said wall surfaces, said rib having a knife-like edge adapted to forming a complemental annular groove along a desired line of separation adjacent a region of substantially maximum cross-sectional dimensions of said hollow article contiguous with its formation by centrifugal casting.

2. The hollow mold defined in claim 1, the said upper edge and surrounding ledge being approximately rectangularly-shaped in plan, said exteriorly-projecting continuous annular rib having an essentially uniform contour and a thin planar edge adapted to molding an integral planar groove adjacent the open end of the article.

3. The hollow mold defined in claim 1, said mold having a peripheral flange extending upwardly from and disposed along the outer edge of said ledge.

4. The hollow mold defined in claim 1, said continuous annular rib having a substantially uniform cross-sectional contour and comprising a terminating portion of the upper edge of said upwardly-flaring mold wall surfaces.

5. A hollow bowl-shaped mold having a generally frusto-pyramidal shaped cavity for centrifugal casting of a hollow glass article, the upper rim portion of the mold being open-ended and approximately rectangular in shape with rounded corners uniting its opposing sides, said rim portion being comprised of a peripheral ledge extending essentially horizontally coextensive with the upper edge of the inner wall surfaces of said mold, said rim portion having an annular flange extending upwardly from the outer extremity of said ledge, and an upwardly-extending annular rib having a knife-like edge contour disposed in close proximity to the upper edge of the mold inner wall surfaces, said annular rib having a substantially uniform cross section with said knife-like edge terminating in a horizontal plane.

6. The method of forming a hollow glass article having upwardly flared sidewalls, which method comprises the steps of entering a charge of molten glass into an open-ended mold having upwardly flaring sidewalls extending toward the open end of the mold, said mold having an outwardly and upwardly projecting rectangularly-shaped annular ledge and flange portion extending around its open end, rapidly rotating the mold about its vertical axis and thereby spreading the glass and causing it to travel up the sidewalls of the mold thus forming a generally frusto-pyramidal shaped open-ended hollow molded article flowing at least a minor portion of the glass horizontally and radially over a sharply-pointed upper edge of the mold into the outwardly-projecting annular ledge during such rotation to form an upper rim of said article simultaneously forming an annular groove having a sharply defined re-entrant angle in the molded underside surface of the upper rim portion, decelerating and stopping the rotation of the mold, and cooling the molded glass article at such a rate so as to establish thermally induced stresses in the glass above the annular groove of such magnitude that severance of the article occurs along such groove upon solidification of the glass.

7. The method defined in claim 6, including the step of removing the molded glass article from the mold following at least initial cooling and solidifying prior to severance of the article along such groove.

8. The method of forming a hollow article having upwardly-flared sidewalls comprising the steps of introducing a charge of thermoplastic material into an open-ended mold having upwardly-flaring sidewalls extending toward the open end of the mold, said mold having an essentially horizontal annular ledge and upright flange portion extending around its open end, rapidly rotating the mold about its axis and thereby spreading and molding said thermoplastic material over the sidewalls of the mold, flowing at least a minor portion of the said thermoplastic material radially outwardly and circumferentially over a sharply-contoured upper edge of the mold into said ledge portion to form an upper rim, concomitantly forming an annular groove having a sharply defined re-entrant angle in the underside surface of the upper rim portion, decelerating and stopping the rotation of the mold, removing the newly-formed article from said mold, and cooling the resulting molded article at such a rate so as to establish thermally induced stresses in the thermoplastic material above the annular groove of such magnitude that severance of the article occurs along such groove upon solidification of the thermoplastic material.

References Cited in the file of this patent

UNITED STATES PATENTS

| | | |
|---|---|---|
| 2,662,346 | Giffen | Dec. 15, 1953 |
| 2,771,712 | Reynolds | Nov. 27, 1956 |
| 2,817,116 | Miller et al. | Dec. 24, 1957 |
| 2,853,834 | Vincent | Sept. 30, 1958 |
| 2,862,232 | Rekettye | Dec. 2, 1958 |
| 2,923,032 | Miller et al. | Feb. 2, 1960 |